(No Model.) 2 Sheets—Sheet 1.
W. V. OOTHOUT.
Pantograph.
No. 241,235. Patented May 10, 1881.
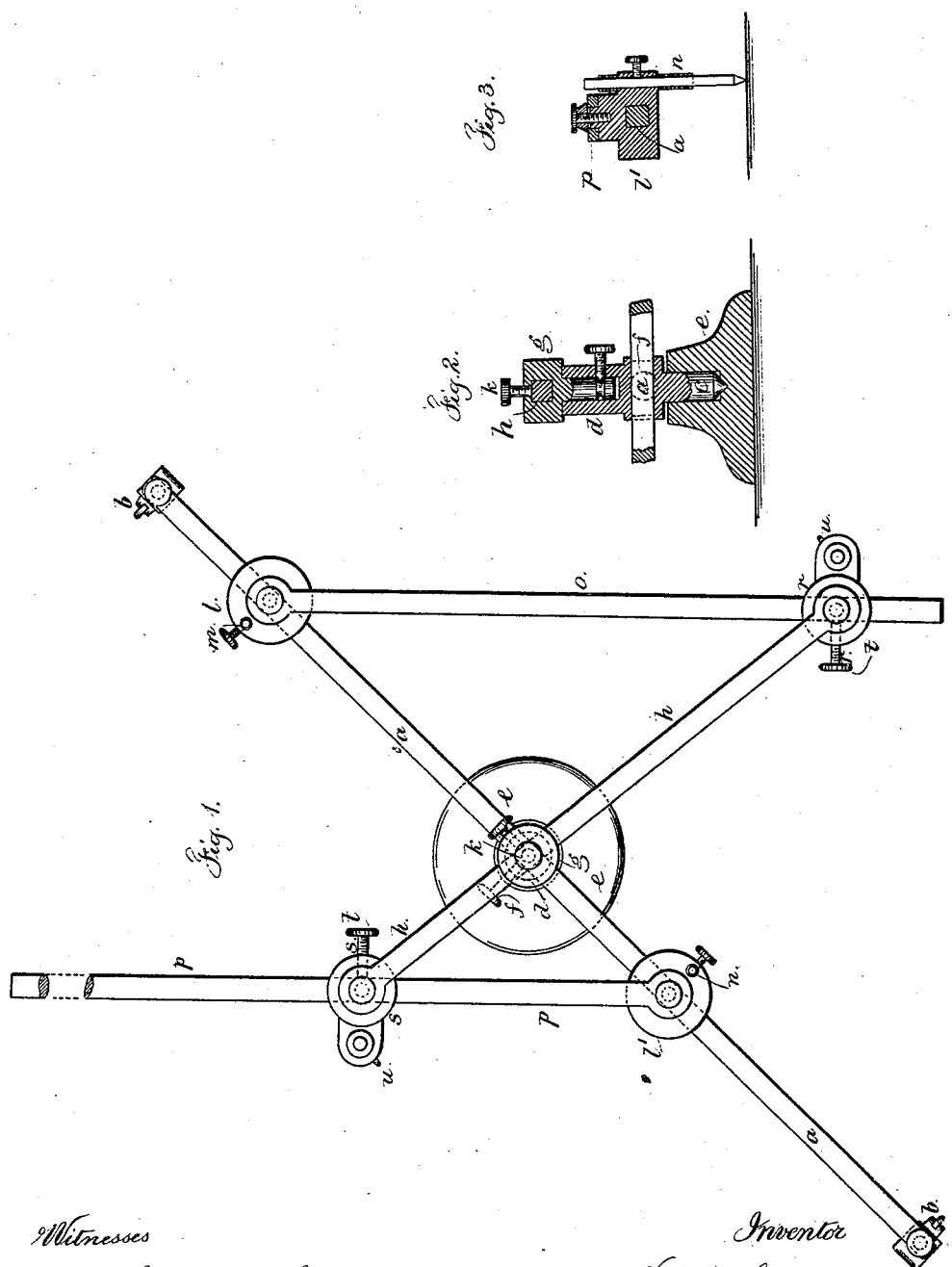
Witnesses
Chas H Smith
J. Stail
Inventor
W. V. Oothout
per Lemuel W. Serrell
atty (No Model.)  2 Sheets—Sheet 2.
W. V. OOTHOUT.
Pantograph.
No. 241,235. Patented May 10, 1881.
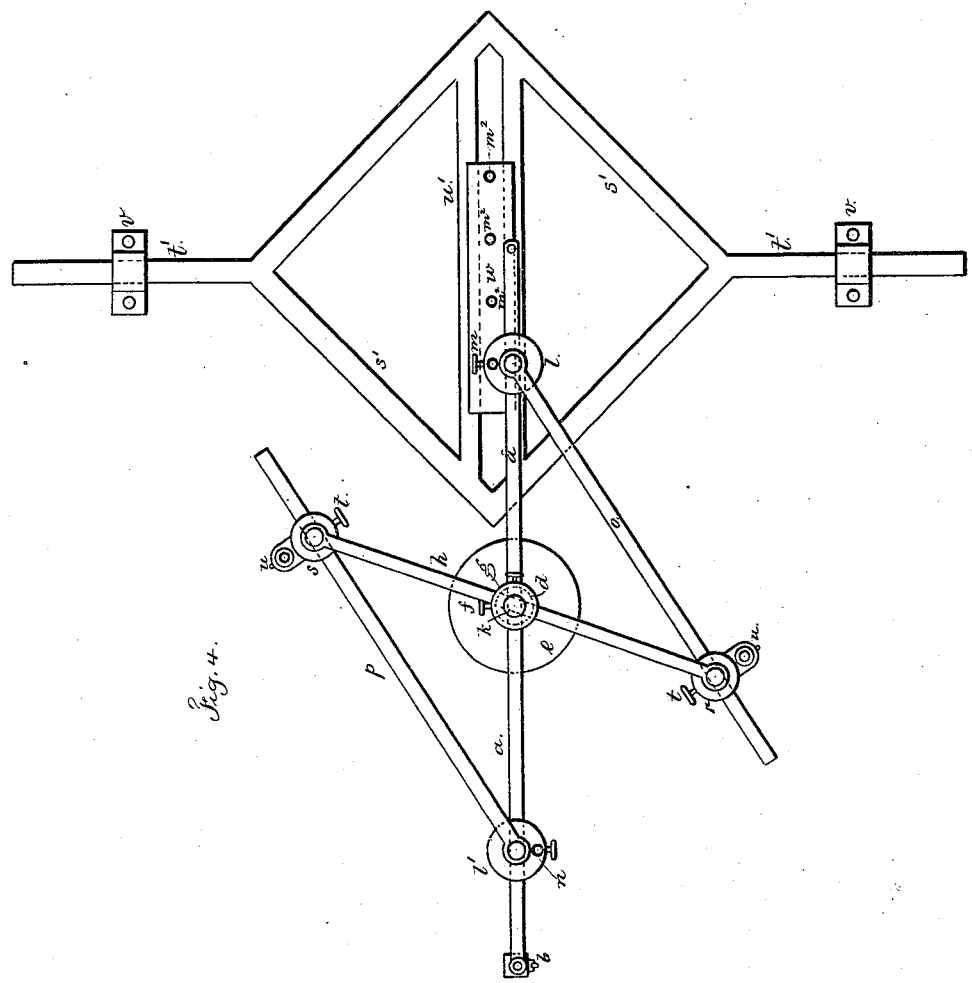
Witnesses
Chas H Smith
J. Staib
Inventor
W. V. Oothout.
per Lemuel W. Serrell

United States Patent Office.

WILLIAM V. OOTHOUT, OF BROOKLYN, E. D., NEW YORK, ASSIGNOR TO HIMSELF AND GIBBONS L. KELTY, OF SAME PLACE.

PANTOGRAPH.

SPECIFICATION forming part of Letters Patent No. 241,235, dated May 10, 1881.

Application filed October 7, 1880. (No model.)

*To all whom it may concern:*

Be it known that I, WILLIAM V. OOTHOUT, of Brooklyn, E. D., in the county of Kings and State of New York, have invented an Improvement in Pantographs, of which the following is a specification.

This instrument is made with especial reference to the copying of patterns for weaving and for the enlargement or reduction of the same, but it is available for other purposes.

Usually pantographs have been made of bars that cross each other and are pivoted together.

In my pantograph the tracer and marker slide endwise upon a bar, and they are moved endwise in proportion to the distance the marker and tracer are from the center of motion, so as to make the copying perfect. I employ two bars that cross each other and swing independently of each other, but have one common center of motion. The lower bar is supported at the ends by caster-wheels, and it forms a slide-bar, upon which the carriers of the tracing and marking points move endwise of the bar; and there are parallel adjustable bars connecting from the tracer and marker, respectively, to the upper crossing bar, the parts being pivoted so that the same proportion of end motion on the slide-bar will be given to the tracer and marker by the connecting-bars that said parts receive when the slide-bar is turned on its pivot. By this means the pattern can be reduced or enlarged with accuracy.

In the drawings, Figure 1 is a plan view of the instrument. Fig. 2 is a section of the central pivot. Fig. 3 is a section of the holder for the tracer or marker, and Fig. 4 shows the instrument adapted to reproduce several figures at once.

The bar $a$ is of suitable length, according to the size of the pattern to be copied. It is preferably flat, and at each end there is a supporting-caster, $b$, that allows the parts to move with but little friction.

The central pivot-block, $d$, has a pivot-pin, $c$, passing down into a stationary block, $e$, and through the block $d$ the bar $a$ passes, and when properly placed is held by the clamp-screw $f$. The upper part of the block $d$ forms a socket for the second pivot-block $g$, through which the upper bar, $h$, passes, and $k$ is a clamp-screw for the same.

$l$ is a slide on the bar $a$, adapted to receive the tracer or marker $m$; and $l'$ is a similar slide on the bar $a$ at the other side of its fulcrum, with the marker or tracer $n$. The bars $o$ and $p$ are pivoted at their respective ends to the slides $l$ and $l'$, and said bars pass the pivoted clamps $r$ and $s$, that are at the respective ends of the upper bar, $h$, and these bars are clamped by the screws $t$, and the joint blocks or pivots are upon casters $u$.

It will now be evident that if the tracer and marker are at the same distance from the center pivot, $d$, and the bars $o$ and $p$ are parallel, the bar $h$ will be clamped in the center, as in Fig. 4. The parts are free to turn upon the common pivot $d$, and the tracer and marker will move the same distance, and, whether moved toward or from the center, $d$, or swung on that center, the marker will have the same movement as the tracer. If the proportion is to be changed the upper bar, $h$, is to be loosened and moved endwise until its ends bear the same proportion to each other that the pattern does to the copy. The bars $o$ and $p$ are to be similarly moved, as indicated in Fig. 1, so that they will be parallel to each other, and the blocks $l$ and $l'$ will be upon the bar $a$ at the same relative distances from the center pivot, $d$, that the one end of $h$ bears to the other; hence the sliding movement endwise on $a$ will be in the proper proportion and correspond to the proportion of leverage in the swinging movement of $a$, and the pattern, hence, will be accurately copied on a reduced or enlarged size, according to whether the tracer is at the shortest or the longest end of the pantograph.

The bars of this pantograph may be either flat or round, but I prefer the former.

The arrangement of the bars that connect the sliding tracer and marker respectively may be changed to suit the other parts of the pantograph so long as the holders for the tracer and marker are made to slide endwise of the pivoted bar in the proper relative proportions. If the tracer and marker are placed upon the parallel forks of a pivoted bar they may be moved endwise by lever-connections that are proportioned to give the proper movement according to the relative distances of the marker and tracer from the pivot on which the lever-bar moves.

In order to adapt my improvement to the reproduction of several figures at once—such, for instance, as those often found across a piece of woven fabric or of oil-cloth—I make use of a compound sliding frame composed of the bars $s'\ s'$, that form a square, the end bars, $t'\ t'$, and the cross-slide $w'$. These are formed in one or firmly connected together, and the end bars, $t'$, slide endwise and freely in the stationary guides $v$. Between the bars of the cross-slide $v$ there is a traveler, $w$, that can move endwise with freedom, and to this the marker of the pantograph is attached, and it will be seen that the compound sliding frame is free to be moved in any direction by the pantograph, and that the traveler will always have a parallel motion. Hence, if two, three, or more markers, $m^2$, are placed in this traveler the figure that is copied will be reproduced as many times as there are pencils.

I claim as my invention—

1. The combination, in a pantograph, of the bar $a$, pivot $d$, clamping-screw $f$, the upper bar, $h$, clamped to the pivot-block $g$, the holders for the tracer and marker, respectively, sliding upon the bar $a$, and the pivoted bars $o\ p$, connecting the upper bar, $h$, to the respective slides $l\ l'$, substantially as set forth.

2. The combination, in a pantograph, of a pivoted bar, which also forms a slide, a holder for a marker and a holder for a tracer sliding endwise upon such bar, and levers that connect the marker and tracer holders and communicate to them a movement that is proportionate to their distance from the center of motion, substantially as set forth.

3. The compound sliding frame $s'\ t'\ w'$, guides $v$, and traveler $w$, carrying two or more markers, in combination with the pantograph for moving the traveler, as set forth.

Signed by me this 29th day of September, A. D. 1880.

W. V. OOTHOUT.

Witnesses:
 GEO. T. PINCKNEY,
 CHAS. H. SMITH.